United States Patent [19]

Suyama

[11] Patent Number: 5,535,050
[45] Date of Patent: Jul. 9, 1996

[54] OPTICAL AMPLIFIER AND OPTICAL COMMUNICATION SYSTEM WITH OPTICAL AMPLIFIER USING PUMPING LIGHT BEAM

[75] Inventor: Masuo Suyama, Sagamihara, Japan

[73] Assignee: Fujitsu Limited, Kawasaki, Japan

[21] Appl. No.: 400,762

[22] Filed: Mar. 8, 1995

Related U.S. Application Data

[62] Division of Ser. No. 189,841, Feb. 1, 1994, which is a continuation of Ser. No. 987,568, Dec. 8, 1992, Pat. No. 5,299,048, which is a continuation of Ser. No. 574,097, Aug. 29, 1990, abandoned.

[30] Foreign Application Priority Data

Aug. 31, 1989  [JP]  Japan .................................. 1-223172

[51] Int. Cl.[6] .......................... H04B 10/00; H04B 10/16; G02B 6/26
[52] U.S. Cl. ......................... 359/341; 359/134; 359/160; 385/4; 385/9
[58] Field of Search .................................. 359/134, 160, 359/341; 385/1, 4, 9

[56] References Cited

U.S. PATENT DOCUMENTS

| | | | |
|---|---|---|---|
| 4,674,830 | 6/1987 | Shaw et al. . | |
| 4,712,075 | 12/1987 | Snitzer et al. | 330/4.3 |
| 4,723,824 | 2/1988 | Shaw et al. | 330/4.3 |
| 4,839,898 | 6/1989 | Payne et al. | 372/6 |
| 4,859,016 | 8/1989 | Shaw et al. . | |
| 4,959,837 | 9/1990 | Fevrier et al. | 372/6 |
| 4,963,832 | 10/1990 | Desurvire et al. | 359/341 |
| 5,005,175 | 4/1991 | Desurvire et al. | 330/4.3 |
| 5,007,698 | 4/1991 | Sasaki et al. | 359/341 |
| 5,008,887 | 4/1991 | Kafka et al. | 372/6 |
| 5,042,039 | 8/1991 | Edagawa et al. . | |
| 5,052,142 | 6/1991 | Aoshima et al. | 250/201.9 |
| 5,054,876 | 10/1991 | Grasso et al. . | |
| 5,204,923 | 4/1993 | Grasso et al. | 385/24 |
| 5,210,808 | 5/1993 | Grasso et al. | 385/27 |
| 5,229,876 | 7/1993 | Fatehi et al. | 359/160 |
| 5,233,463 | 8/1993 | Grasso et al. | 359/341 |
| 5,268,786 | 12/1993 | Matsushita et al. | 359/341 |
| 5,282,079 | 1/1994 | Laming et al. . | |
| 5,285,306 | 2/1994 | Heidemann | 359/160 |
| 5,299,048 | 3/1994 | Suyama | 359/179 |
| 5,315,674 | 5/1994 | Asako | 359/177 |
| 5,343,320 | 8/1994 | Anderson | 359/160 |
| 5,374,973 | 12/1994 | Maxham et al. | 359/341 |
| 5,414,554 | 5/1995 | Aoyama | 359/344 |

FOREIGN PATENT DOCUMENTS

| | | | |
|---|---|---|---|
| 0339840 | 11/1989 | European Pat. Off. | 319/134 |
| 0345957 | 12/1989 | European Pat. Off. | 372/6 |
| 55-155901 | 12/1977 | Japan . | |
| 56-144416 | 11/1981 | Japan . | |
| 56-144415 | 11/1981 | Japan . | |
| 56-165437 | 12/1981 | Japan | 455/601 |

(List continued on next page.)

OTHER PUBLICATIONS

*ELECTRONICS LETTERS*, vol. 25, No. 17, Aug. 17, 1989, "Amplification of Mode–Locked Semiconductor Diode Laser Pulses in Erbium–Doped Fibre Amplifier", Baker et al., pp. 1131–1133.

(List continued on next page.)

*Primary Examiner*—Nelson Moskowitz
*Attorney, Agent, or Firm*—Staas & Halsey

[57] ABSTRACT

An optical transmission system transmits an optical signal. The optical transmission system may include an optical amplifier. The optical amplifier amplifies a received optical signal. A pumping light source outputs a pumping light beam and monitor information or supervisory information. This optical amplifier is adapted to amplify the received optical signal by propagating the received optical signal. An optical fiber which may be doped with a rare-earth element. An optical coupler couples the received optical signal and a first pumping light beam to the input of the optical fiber. Through propagation of the signal through the optical fiber, the received optical signal is amplified.

18 Claims, 6 Drawing Sheets

FOREIGN PATENT DOCUMENTS

| | | | |
|---|---|---|---|
| 57-99794 | 6/1982 | Japan . | |
| 58-48513 | 3/1983 | Japan . | |
| 58-53243 | 3/1983 | Japan . | |
| 58-85588 | 5/1983 | Japan . | |
| 58-115948 | 7/1983 | Japan . | |
| 58-119241 | 7/1983 | Japan . | |
| 59-126696 | 7/1984 | Japan | 372/6 |
| 61-75326 | 4/1986 | Japan | 455/612 |
| 63-200632 | 8/1988 | Japan | 455/609 |
| 1-217424 | 8/1989 | Japan | 319/160 |
| 4-75036 | 3/1992 | Japan | 359/341 |
| 2227359 | 7/1990 | United Kingdom | 372/6 |

OTHER PUBLICATIONS

*ELECTRONICS LETTERS*, vol. 25, No. 14, Jul. 6, 1989, "16–Channel Optical FDM Distribution/Transmission Experiment Utilising ER3±Doped Fibre Amplifier", Toba et al., pp. 885–887.

PATENT ABSTRACT OF JAPAN, vol. 008, No. 219 (P–306), Oct. 5, 1984 & JP–A–59 101629 (NIPPON DENKI KK), Jun. 12, 1984, *abstract*.

*ELECTRONICS LETTERS*, vol. 25, No. 10, May 11, 1989, "250 KM Nonrepeated Transmission Experiment at 1.8 Gb/s Using LD Pumped ER3±Doped Fibre Amplifiers in IM/Direct Detection System", K. Hagimoto et al., pp. 662–664.

PATENT ABSTRACTS OF JAPAN, vol. 10, No. 247 (P–490) (2303) 26 Aug. 1986 & JP–A–61 075 326 (NEC).

WO–A–8 607 642 (BRITISH TELECOMMUNICATIONS) *abstract; FIGS. 1–3, p. 4, line 22–33*.

JOURNAL OF LIGHTWAVE TECHNOLOGY, vol. 6, No. 10, Oct. 1988, "Crosstalk in 1.5—μM InGaAsP Optical Amplifiers", H. E. Lassen et al., pp. 1559–1565.

JOURNAL OF LIGHTWAVE TECHNOLOGY, vol. 7, No. 5, May 1989, "Two–Stage High–Gain Optical Amplfier", N. A. Olsson et al., pp. 791–793.

OFC/i00C '87, "High–Gain Rare–Earth–Doped Fiber Amplifier at 1.54 μm", R. J. Mears et al.

ECOC '88, "Noise in Erbium–Doped Fibre Amplifiers", R. I. Laming et al., pp. 54–57.

ELECTRONICS LETTERS, vol. 25, No. 14, Jul. 6, 1989, "High–Gain, Broad Spectral Bandwidth Erbium–Doped Fibre Amplifier Pumped Near 1.5 μm", C. G. Atkins et al., pp. 910–911.

ELECTRONICS LETTERS, vol. 25, No. 5, Mar. 2, 1989, "1.2 Gbit/s, 218 km Transmission Experiment Using In-line Er–Doped Optical Fibre Amplifier", N. Edagawa et al., pp. 363–365.

ELECTRONICS LETTERS, vol. 24, No. 25, Dec., 1988, "Optical Soliton Propagation Using 3GHz Gain–Switched 1.3 μm Laser Diodes", K. Iwatsuki et al., pp. 1572–1574.

OPTICS LETTERS, vol. 12, No. 11, Nov. 1987, "High–Gain Erbium–Doped Traveling–Wave Fiber Amplifier", E. Desurvire et al., pp. 888–890.

ELECTRONICS LETTERS, vol. 25, No. 9, Apr. 27, 1989, "Mutual Signal Gain Saturation in $Er^{3+}$–Doped Fibre Amplifier Around 1.54 μm Wavelength", pp. 594–595.

ELECTRONICS LETTERS, vol. 24, No. 1, Jan. 7, 1988, "400 Mbit/s, 372 km Coherent Transmission Experiment Using In–line Optical Amplifiers", N. A. Olsson et al., pp. 36–38.

ELECTRONICS LETTERS, vol. 24, No. 1, Jan. 7, 1988, "313 km Transmission Experiment at 1 Gbit/s Using Optical Amplifiers and a Low Chirp Laser", M. G. Oberg et al., pp. 38–39.

ELECTRONICS LETTERS, vol. 24, No. 22, No. 22, Oct. 27, 1988, "Noise Figure for Erbium–Doped Optical Fibre Amplifiers", R. Olshansky, pp. 1363–1365.

JOURNAL OF LIGHTWAVE TECHNOLOGY, vol. 7, No. 4, Apr. 1989, "2–Gbit/s Signal Amplification at $\lambda=1.53$ μm in a Erbium–Doped Single–Mode Fiber Amplifier", C. R. Giles et al. pp. 651–656.

IOOC '89, Jul. 18–21, 1989, Post–Deadline Papers, 20A3–1, "Advances in Active Fibres", D. N. Payne, pp. 1–3.

IOOC '89, Jul. 18–21, 1989, Post–Deadline Papers, 20PDA–7, "An 11 Gb/s, 151 km Transmission Experiment Employing a 1480 nm Pumped Erbium–Doped In–Line Fiber Amplifier", M. Z. Iqbal et al., pp. 24–25.

IOOC '89, Jul. 18–21, 1989, Post–Deadline Papers, 20PDA–8, "Transmission of 12 Gb/s Over 100 km Using an LD–Pumped Erbium–Doped Fiber Amplifier and a Ti:L-iNbO₃ Mach–Zehnder Modulator", H. Nishimoto et al., pp. 26–27.

IOOC '89 TECHNICAL DIGEST, vol. 4 of 5, Jul. 21, 1989, 21B3–3, "1.8 Gb/s Transmission Over 210 km Using an Erbium–Doped Fiber Laser Amplifier with 20 dB Repeater Gain in a Direct Detection System", A. Takada et al., pp. 30–31.

IOOC '89 TECHNICAL DIGEST, vol. 4 of 5, Jul. 21, 1989, 21B4–1, "267 km, 1.2 Gbit/s Optical Transmission Experiment Using Two In–Line LD–Pumped Er–Doped Optical Fiber Amplifiers and an Electroabsorption Modulator", N. Edagawa et al., pp. 32–33.

IOOC '89 TECHNICAL DIGEST, vol. 3 of 5, Jul. 20, 1989, 20A4–3, "Polarization–Independent Gain of $Er^{3+}$–Doped Fiber Amplifier Under Single–Mode Pumping", N. Suyama et al., pp. 32–33.

IOOC '89 TECHNICAL DIGEST, vol. 3 of 5, Jul. 20, 1989, 20A4–4, "Transient Gain and Crosstalk Effects in Erbium–Doped Fiber–Amplifiers", C. R. Giles et al., pp. 34–35.

OFC '89, Feb. 6–9, 1989 Post Deadline Papers, PD6–1, "14.4–dB Gain of Erbium–Doped Fiber Amplifier Pumped by 1.49 μm Laser Diode", M. Suyama et al., pp. 1–4.

OFC '89, Feb. 6–9, 1989, Post Deadline Papers, PD15–1, "A 212 km Non–Repeated Transmission Experiment at 1.8 Gb/s Using LD Pumped $Er^3$±Doped Fiber Amplifiers in an IM/Direct–Detection Repeater System", K. Hagimoto et al., pp. 15–1–15–4.

OFC '89, Feb. 6–9, 1989, Technical Digest, vol. 5, TUG5, "Efficient High–Gain Erbium–Doped Fiber Amplifier Pumped with a Frequency–Doubled Nd: YAG Laser", M. C. Farries et al.

OFC '89, Feb. 6–9, 1989, Technical Digest, vol. 5, TUG7, "Saturation–Induced Crosstalk in High–Speed Erbium–Doped Fiber Amplifer at $\lambda=1.53$ μm", E. Desurvire et al.

CLEO '89, Apr. 24–28, 1989, Post Deadline Papers, PD20–1 and 20–2, "Efficient Erbium–Doped Fiber Amplifier at $\lambda=1.53$ μm with High Output Saturation Power", E. Desurvire et al.

CLEO '89, Apr. 24–28, 1989, Post Deadline Papers, PD22–1 and 22–2, "Performance of an Erbium–Doped Fiber Amplifier in a 16–Channel Coherent Broadcast Network Experiment", R. Welter et al.

CLEO '89, Apr. 24–28, 1989, Technical Digest, vol. 11, WF10, "Studies of Excited State Absorption at 1.5 μm in $Er^{3+}$–Doped Silica Fibers", J. R. Armitage et al., pp. 180–181.

APPLIED PHYSICS, vol. 24, No. 3, Mar. 1981, "Laser Amplification in an Optical Fiber by Evanescent Field Coupling", N. Periasamy et al., pp. 201–203.

PROCEEDINGS OF THE IEEE, vol. 57, No. 7, Jul. 1969, "Glass Lasers", C. G. Young, pp. 1267–1289.

ELECTRONICS LETTERS, Sep. 29, 1983, vol. 19, No. 20, "Evanescent Amplification in a Single–Mode Optical Fibre", W. V. Sorin et al., pp. 820–822.

APPLIED PHYSICS LETTERS, vol. 23, No. 7, Oct. 1, 1973, "Neodymium–Doped Silica Lasers in End–Pumped Fiber Geometry", J. Stone et al., pp. 388–389.

APPLIED OPTICS, vol. 13, No. 6, Jun. 1974, "Neodymium–Doped Fiber Lasers: Room Temperature cw Operation with an Injection Laser Pump", J. Stone et al., pp. 1256–1258.

IEEE JOURNAL OF QUANTUM ELECTRONICS, vol. QE–2, No. 9, Sep. 1966, "9A4–Laser Action by Enhanced Total Internal Reflection", C. J. Koester, pp. 580–584.

THE INSTITUTE OF ELECTRONICS, INFORMATION AND COMMUNICATION ENGINEERS TECHNICAL REPORT, vol. 88, No. 416, OQE88–123, Feb. 1, 1989, "Amplification Characteristics of Er–Doped Optical Fiber Amplifiers", N. Edagwa et al., pp. 85–90.

THE INSTITUTE OF ELECTRONICS, INFORMATION AND COMMUNICATION ENGINEERS TECHNICAL REPORT, vol. 89, No. 48, OQE89–18, May 22, 1989, "Optical Amplification Characteristics of Erbium–Doped Fiber", M. Suyama et al., pp. 55–60.

THE INSTITUTE OF ELECTRONICS, INFORMATION AND COMMUNICATION ENGINEERS TECHNICAL REPORT, vol. 89, No. 32, OCS89–3, May 18, 1989, "A Study of Long Span Gigabit/s Optical Transmission Systems Using Fiber Amplifiers", K. Hagimoto et al., pp. 13–20.

THE INSTITUTE OF ELECTRONICS, INFORMATION AND COMMUNICATION ENGINEERS TECHNICAL REPORT, vol. 89, No. 32, OCS89–4, May 18, 1989, "Optical Amplifier Using Rare–Earth Doped Fibers", K. Nakamura et al., pp. 21–27.

CLEO '88, Apr. 25–29, 1988, Post Deadline Papers, PD9–1, "Characterization of High–Spped Signal Amplification at $\lambda=1.53$ µm in an Erbium–Doped Single–Mode Fiber", C. R. Giles et al., pp. 473–476.

CLEO '88, Apr. 25–29, 1988, Technical Digest, vol. 7, THH4, "Gain and Excited–State Absorption in Neodymium–Doped Optical Fiber Laser", P. R. Morkel et al., pp. 320–321.

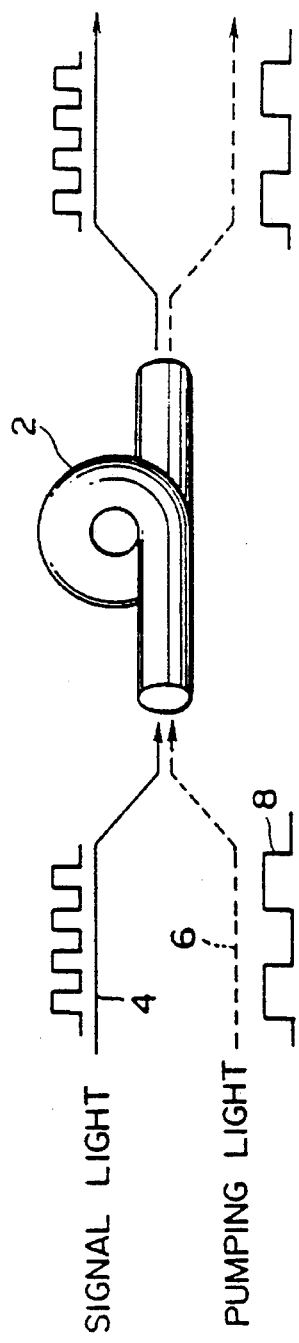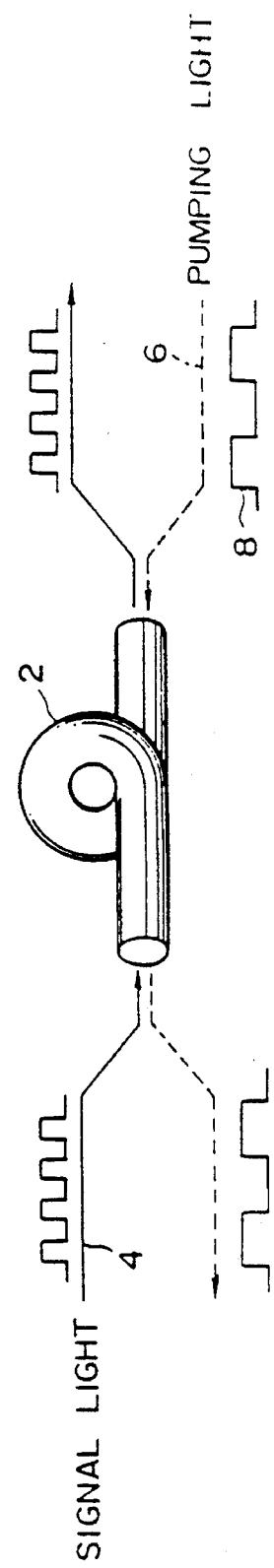

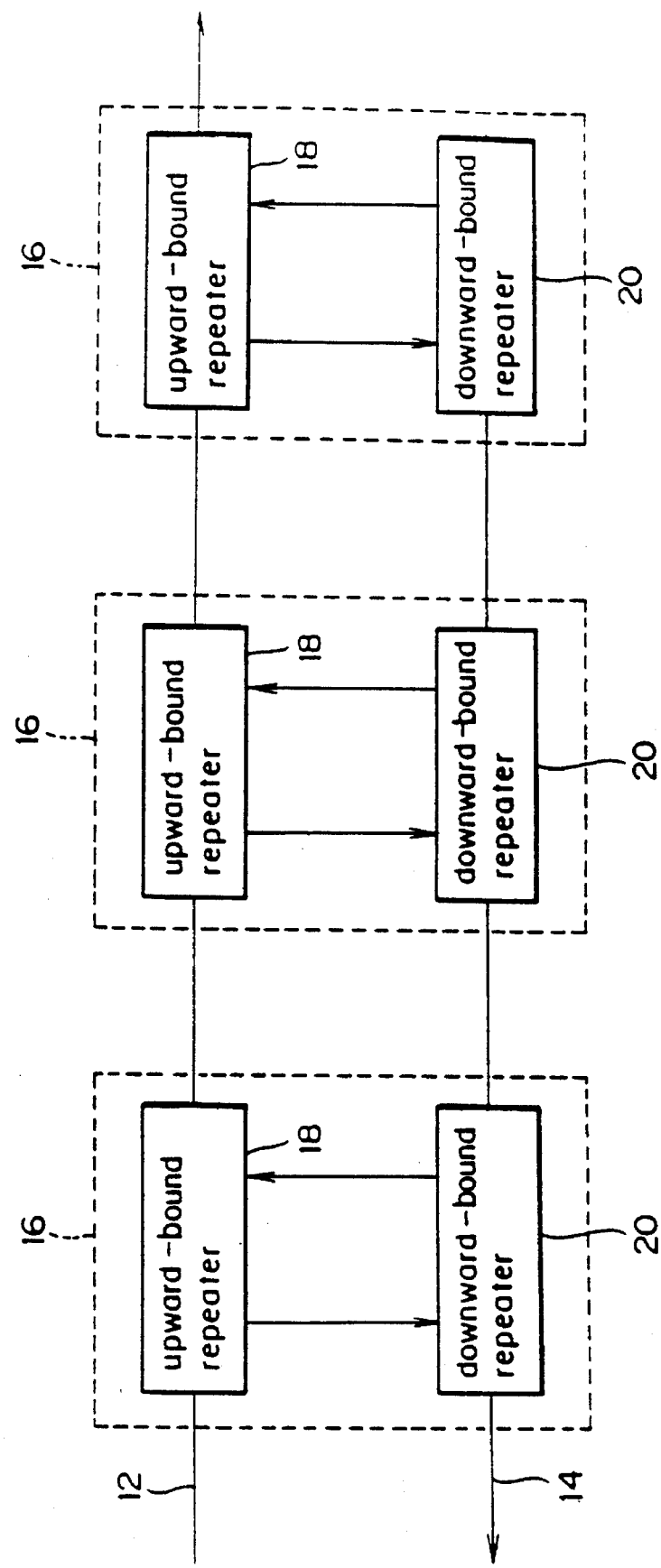

OPTICAL AMPLIFIER AND OPTICAL COMMUNICATION SYSTEM WITH OPTICAL AMPLIFIER USING PUMPING LIGHT BEAM

CROSS-REFERENCE TO RELATED APPLICATIONS

This application is a division of application Ser. No. 08/189,841, filed Feb. 1, 1994, which is a continuation of application Ser. No. 07/987,568, filed Dec. 8, 1992, now U.S. Pat. No. 5,299,048, and which is a continuation of application Ser. No. 07/574,097, filed Aug. 29, 1990, now abandoned. This application is also related to application Ser. Nos. 08/400,755; 08/400,760 and 08/400,761, all filed Mar. 8, 1995.

BACKGROUND OF THE INVENTION

The present invention relates to an optical communication system provided with an optical fiber amplifier and, more particularly, to an optical communication system provided with an optical fiber amplifier constituted of a rare-earth-doped fiber which is doped with a rare earth element.

Optical amplifiers capable of amplifying an optical signal directly, without using an electric circuit, are being intensively studied in many research institutions as a key device in the optical communication system of the future because of their bit-rate-free characteristic, ability to provide large capacity, and capability of amplifying multiple channels en bloc. As optical communication systems including such optical amplifiers, there are proposed those that employ the optical amplifier as an optical power booster for compensating for branching or insertion loss and increasing the transmission power, those that use the optical amplifier as an optical preamplifier for improvement of reception sensitivity, those that use the optical amplifier as an optical repeater, whereby miniaturization of the repeater is achieved and reliability of the repeater is enhanced, and so on. Research is being conducted for optimized arrangement of such systems.

Optical amplifiers, which are the objects of the research conducted so far, are broadly classified into: (a) amplifiers using an optical fiber doped with a rare earth element such as Er, Nd, and Yb (hereinafter referred to as "rare-earth-doped fiber", wherein this term covers a wide range of waveguide structures including a waveguide doped with a rare earth element); (b) semiconductor laser type amplifiers; and (c) amplifiers which make use of the non-linearity within an optical fiber. Of these, the optical amplifier (a) above, i.e., one that uses a rare-earth-doped fiber, has a number of advantageous characteristics, such as polarization independence, low noise production, and a small loss at its coupling with the transmission line.

When an optical amplifier is used as an optical repeater, a supervisory control function for the optical amplifier is indispensable. As a supervisory system applicable to the optical amplifier (b) above, i.e., the semiconductor laser type, there is known a system disclosed, for example, in Ellis, A. D. et al.: *Supervisory System for Cascaded Semiconductor Laser Amplifier Repeaters*, Electron Lett., Vol. 25, No. 5, pp. 309–311 (2nd March 1989). Since in this system the injection current to the semiconductor laser type optical amplifier is detected therein, the same system cannot be applied to the optical communication system provided with an optical fiber amplifier. In other words, there is no prior art supervisory control system which is suitable for optical fiber amplifiers.

SUMMARY OF THE INVENTION

An optical communication system provided with an optical fiber amplifier uses a pumping light beam to effect optical amplification. Hence, if transmission of information using the pumping light beam can be performed in the system in addition to transmission of information with a signal light beam, then, it becomes possible to have supervisory control performed in the optical communication system provided with the optical fiber amplifier as an optical repeater. The optical amplification of a signal light beam is effected not only when a pumping light beam introduced into a rare-earth-doped fiber propagates in the same direction as the signal light beam but also when it propagates in a direction opposite to the signal light beam. Therefore, if transmission of information is possible with the use of the pumping light beam, it becomes possible to achieve a two-way transmission by making use of such characteristics.

Accordingly, an object of the present invention is to provide an optical communication system having an optical fiber amplifier capable of transmission of information with a signal light beam, in addition to transmission of information with a signal light beam.

In accordance with an aspect of the present invention, there is provided an optical communication system having an optical repeater including an optical fiber amplifier adapted to amplify a signal light beam by having the signal light beam and a pumping light beam propagated through the rare-earth-doped fiber of the optical element, which is doped with a rare earth element. This system includes a pumping light source for emitting the pumping light beam, and means for modulating the pumping light beam with a high-frequency modulating signal having a period shorter than the life span of fluorescence resulting from an excited state, whereby transmission of information with the pumping light beam acting as a carrier, and transmission of information with the signal light beam made are achievable.

Since in the present invention the pumping light beam is modulated by a high-frequency modulating signal with a period shorter than the life span of the fluorescence resulting from an excited state, achieving transmission of information with the pumping light beam, in addition to transmission of information with the signal light beam, without adversely affecting the amplification of the signal light beam by the pumping light beam is possible. Consequently, in the case where the signal light beam and the pumping light beam are arranged to be propagated in the same direction through the rare-earth-doped fiber, the transmission of a supervisory signal for an optical repeater can be readily achieved by using the pumping light beam as the carrier.

In the case where the signal light beam and the pumping light beam are arranged to be propagated in opposite directions through the rare-earth-doped fiber, a two-way transmission can be achieved by transmission of information with the signal light beam and transmission of information with the pumping light beam. The transmission of information with the pumping light beam includes a supervisory signal transmission for an optical repeater.

The above and other objects, features and advantages of the present invention and the manner of realizing them will become more apparent, and the invention itself will best be understood from a study of the following description and appended claims, with reference to the attached drawings which show some preferred embodiments of the invention.

BRIEF DESCRIPTION OF THE DRAWINGS

FIG. 4A is a diagram illustrating the principle of the present invention in the case where the signal light beam and the pumping light beam propagate in the same direction;

FIG. 4B is a diagram illustrating the principle of the present invention in the case where the signal light beam and the pumping light beam propagate in opposite directions;

FIG. 5 is a block diagram of an optical repeater unit according to an embodiment of the present invention;

DESCRIPTION OF THE PREFERRED EMBODIMENTS

Figure 1:
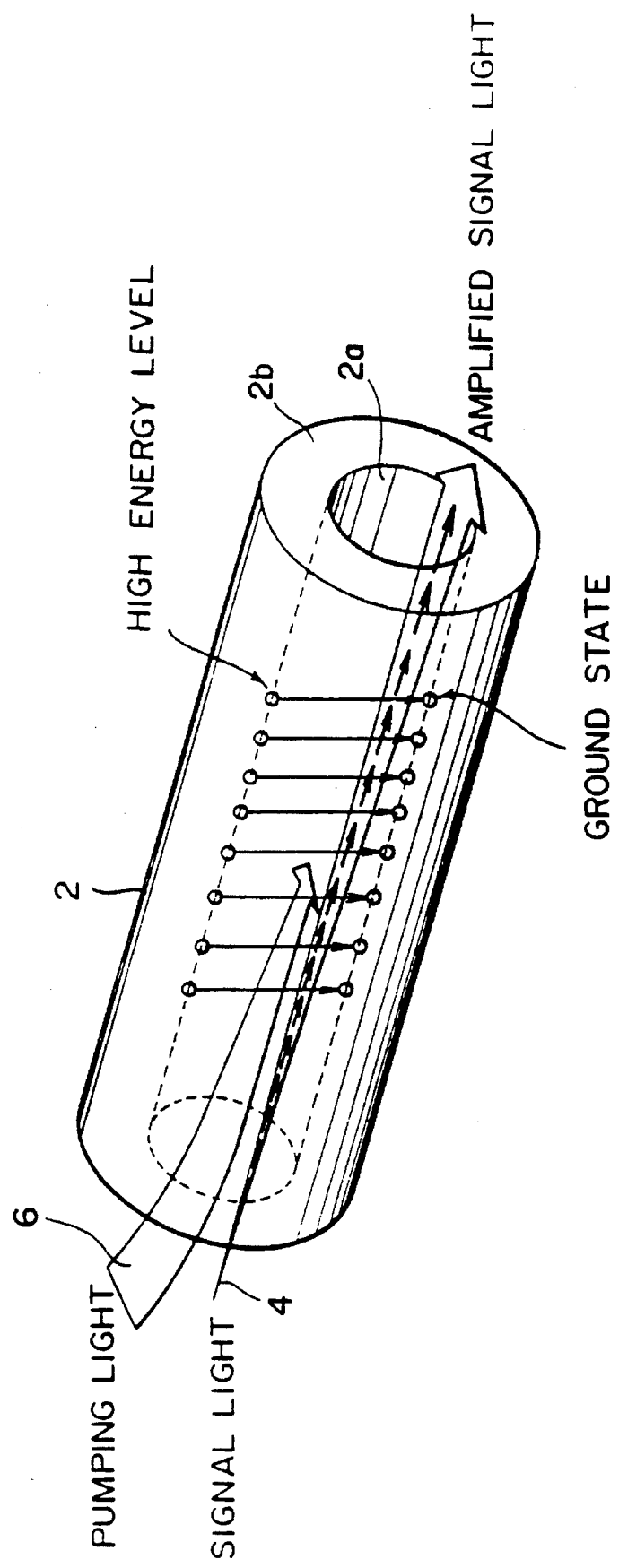
FIG. 1 is a schematic diagram showing the principle of optical amplification effected by a rare-earth-doped fiber.

FIG. 1 illustrates the principle of optical amplification by means of a rare-earth-doped fiber. Reference numeral 2 denotes a rare-earth-doped fiber formed of a core 2a and a clad 2b, of which the core 2a is doped with a rare earth element such as erbium (Er). When a pumping light beam is led into such a rare-earth-doped fiber 2, the rare earth atoms are excited to a high energy level. When a signal light beam is allowed to impinge on the rare earth atoms excited to the high energy level within the optical fiber 2, stimulated emission of light takes place, causing transition of the rare earth atoms to the ground state. As a result, the intensity of the signal light beam is progressively increased along the optical fiber, and thus, amplification of the signal light beam is effected.

In the case where the doped rare earth element is erbium (Er), a laser beam whose wavelength is 1.49 μm band, for example, can be used as the pumping light beam when the signal light beam with a wavelength of 1.55 μm band is to be amplified. In the case where the doped rare earth element is neodymium (Nd), a laser beam whose wavelength is 0.8 μm band, for example, can be used as the pumping light beam when the signal light beam with a wavelength of 1.3 μm band is to be amplified. A description of the present invention, provided below, assumes that the doped rare earth element is erbium.

Figure 2:
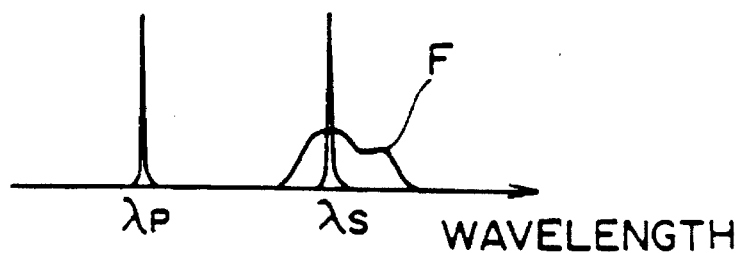
FIG. 2 is a graph illustrating fluorescence.
Figure 3:
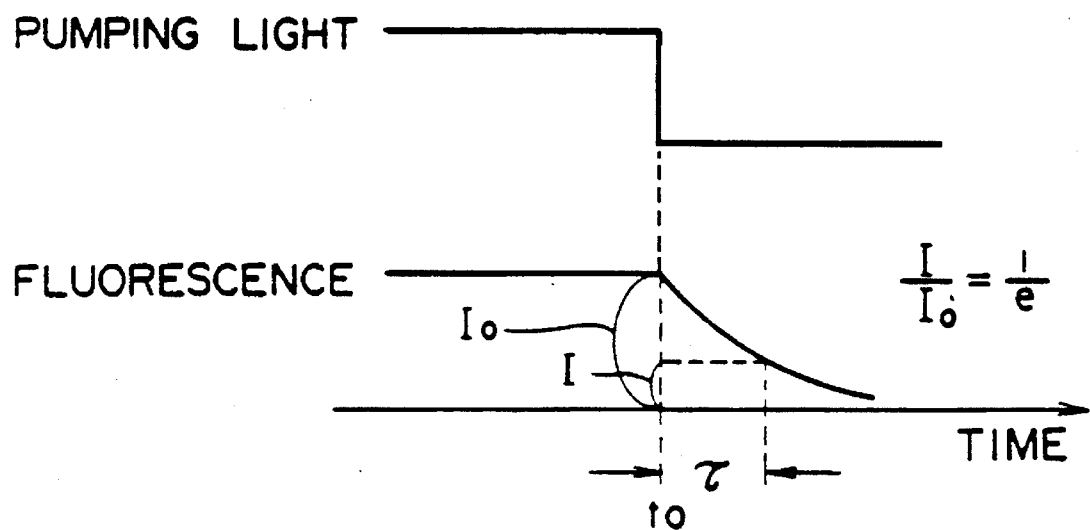
FIG. 3 is a graph of the life span of fluorescence.

When a pumping light beam with a wavelength $\lambda P$ is led into a rare-earth-doped fiber through which a signal light beam with a wavelength $\lambda s$ is being propagated, the wavelength $\lambda P$ being in a predetermined wavelength relationship with the wavelength $\lambda s$, produces fluorescence. The spectrum of the fluorescence is illustrated by character F in FIG. 2 within the rare-earth-doped fiber in the vicinity of the spectrum of the signal light beam. The variation in the intensity of the fluorescence with time is not completely coincident with the variation in the intensity of the pumping light beam with time. That is, as shown in FIG. 3, if the introduction of the pumping light beam is stopped at time $t_0$, the intensity of the fluorescence does not become zero instantly, but it gradually decreases over a certain time constant. When the life span of fluorescence is defined as the time $\tau$ which is taken for the intensity I of the fluorescence to decrease from its value $I_0$ obtainable before the introduction of the pumping light beam is stopped to $1/e$ of $I_o$ (where e is the base of the natural logarithm), it is known that, even if the introduction of the pumping light beam is stopped, the amplification action for the signal light beam is maintained without causing unstable variations in the gain for a period of time within the range from the point of time $t_0$ to, approximately, when the life span of fluorescence $\tau$ elapses (Laming, R. I. et al.: *Multi-channel Crosstalk and Pump Noise Characterization of $Er^{3+}$-doped Fibre Amplifier Pumped at 980 nm*, Electron. Lett., Vol. 25, No. 7, pp. 455–456 (30th March 1989)).

Accordingly, when a pumping light beam is modulated by a high-frequency modulating signal whose period is shorter than the life span of fluorescence resulting from the excited state or thereabout, the modulation does not have an adverse effect on the amplification of the signal light beam.

Referring to FIG. 4A and FIG. 4B, FIG. 4A is used to illustrate the principle of the present invention in the case where the signal light beam and the pumping light beam are propagated in the same direction through a rare-earth-doped fiber. FIG. 4B is used to illustrate the principle of the present invention for the case where the signal light beam and the pumping light beam are propagated in opposite directions through a rare-earth-doped fiber.

The system of the present invention is such that, in an optical communication system provided with an optical fiber amplifier for amplifying a signal light beam 4 by having the signal light beam 4 and a pumping light beam 6 propagated through a rare-earth-doped fiber 2 which is doped with a rare earth element, the pumping light beam 6 is modulated by a high-frequency modulating signal 8 with a period shorter than the life span of fluorescence resulting from an excited state or thereabout, such that transmission of information with the pumping beam 6 acting as a carrier, in addition to transmission of information with the signal light beam 4, is achievable.

Here, the rare-earth-doped fiber 2 has, as described above, a wide meaning that covers general waveguide structures such as waveguides doped with a rare earth element. Therefore, an optical fiber amplifier which achieves amplification of a signal light beam by propagating the signal light beam together with a pumping light beam through a rare-earth-doped fiber doped with a rare earth element, covers not only optical amplifiers which use optical fibers as propagating media of light but also optical amplifiers which use optical waveguide structures such as optical waveguides, as propagating media of light.

When the signal light beam and the pumping light beam are propagated in the same direction through the rare-earth-doped fiber as shown in FIG. 4A, transmission of a supervisory signal for the optical repeater with the pumping light beam acting as the carrier can be achieved.

On the other hand, when the signal light beam and the pumping light beam are propagated in opposite directions through the rare-earth-doped fiber, as shown in FIG. 4B, a two-way transmission including transmission of information with the signal light beam and transmission of information with the pumping light beam acting as the carrier, can be achieved.

FIG. 5 is a diagram of an optical repeater unit with the present invention applied thereto. The drawing shows a system of two-way optical transmission lines formed of an upward-bound optical transmission line 12 and a downward-bound optical transmission line 14 with a single or a plurality (three in the illustrated case) of optical repeater units 16 provided along the two-way optical transmission lines. Each optical repeater unit 16 includes an upward-bound repeater 18 connected with the upward-bound optical transmission line 12 and a downward-bound repeater 20 connected with the downward-bound optical transmission line 14. The upward-bound repeaters 18 and downward-bound repeaters 20 perform communication of supervisory information therebetween for achieving a supervisory control function for the optical repeater units 16 in addition to general repeater functions. While the communication of the supervisory information between the upward-bound and downward-bound repeaters 18 and 20 is achieved by means of electric signals, the transmission of supervisory information through the optical transmission lines 12 and 14 is achieved by means of pumping light beams propagated through rare-earth-doped fibers included in the optical repeater units 16.

Figure 6:
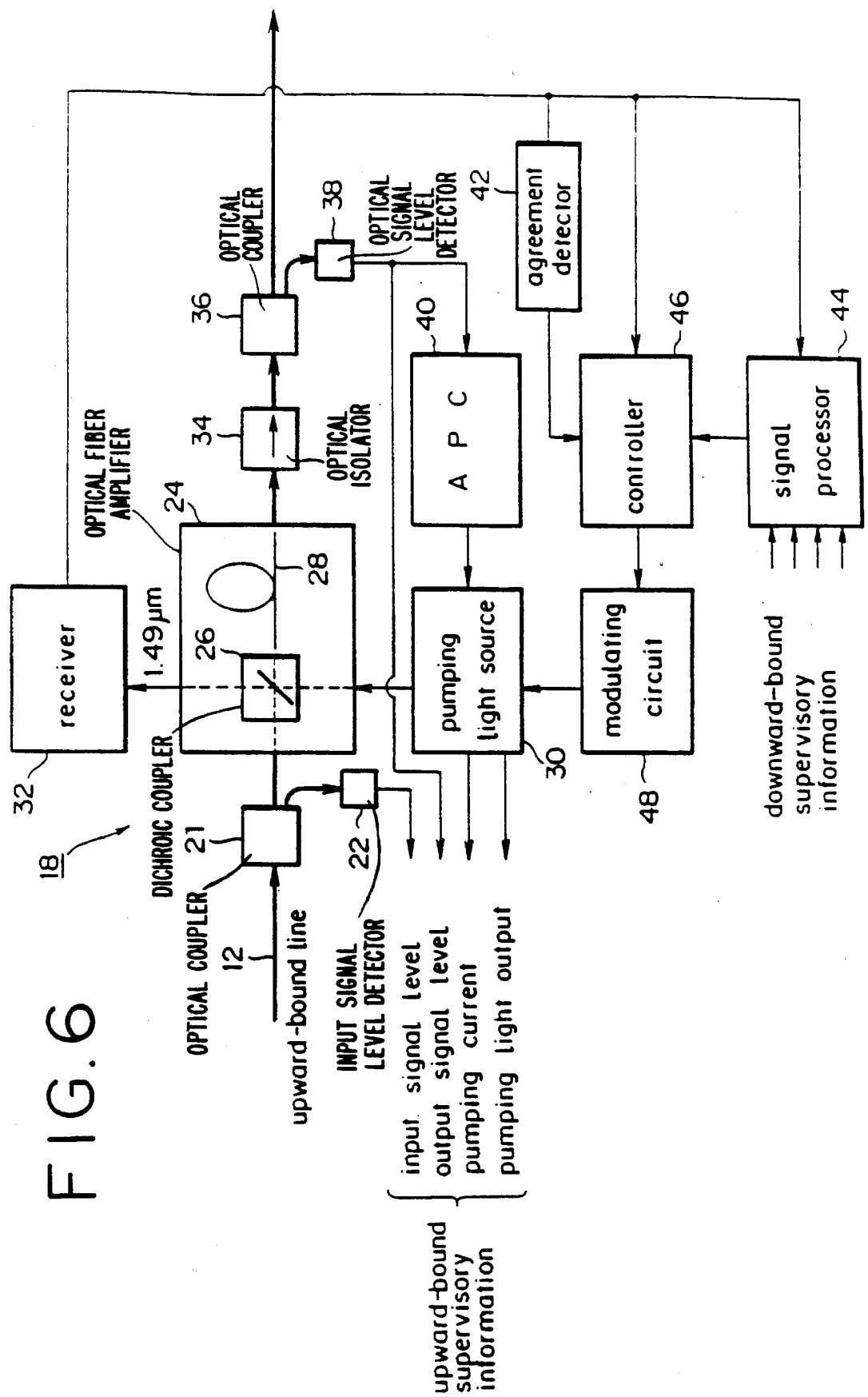
FIG. 6 is a block diagram of an upward-bound repeater according to an embodiment of the present invention.

FIG. 6 is a block diagram of the upward-bound repeater 18. The downward-bound repeater 20 has the same block structure as the upward-bound repeater 18. Referring to FIG. 6, the wavelength of the signal light beam propagated through the upward-bound optical transmission line 12 is 1.536 μm, or 1.552 μm, for example, and the wavelength of the pumping light beam is 1.49 μm, for example. The portion of the pumping light beam which has not contributed to the optical amplification arrives at an upward-bound repeater 18. The signal light beam and the pumping light beam are split by an optical coupler 21 into portions in a ratio of 1:100, for example. The smaller split portion of the beams is input to an input signal level detector 22 for level detection of the signal light beam. The larger split portion of the beams is input to an optical fiber amplifier 24.

The optical fiber amplifier 24 comprises a dichroic coupler 26 and a rare-earth-doped fiber 28 with its core doped with erbium. The dichroic coupler 26 splits the beams from the optical coupler 21 into the signal light beam and the pumping light beam, and leads the signal light beam into the rare-earth-doped fiber 28 and the pumping light beam into a receiver 32. The dichroic coupler 26 further reflects a pumping light beam from a pumping light source 30 into the rare-earth-doped fiber 28.

The signal light beam amplified by the optical fiber amplifier 24 and the portion of the pumping light beam not consumed in the amplification of the signal light beam together are input to an optical coupler 36 through an optical isolator 34. The optical isolator 34 is provided for preventing oscillation from occurring due to gain of the rare-earth-doped fiber 28 as the result of formation of a resonator structure in the optical path including the rare-earth-doped fiber 28. The optical coupler 36 splits the input signal light beam and pumping light beam into portions in the ratio of 1:100, of which the larger split portions of the beams are reintroduced into the upward-bound optical transmission line 12 and the smaller split portions of the beams are input to an output signal level detector 38. The output signal level detector 38 suppresses the pumping light beam by means of an optical filter 37 incorporated therein, and detects the level of the amplified signal light beam.

The pumping light source 30 is formed by a semiconductor laser in the present embodiment, and the intensity of the pumping light beam output therefrom (or the average value thereof) is controlled so that the level of the above-described output signal may become constant by means of an automatic power control (APC) circuit 40 depending on the signal output from the output signal level detector 38. By virtue of the above-described control, it becomes possible to hold the signal light beam output from the upward-bound repeater 18 at a constant level at all times, regardless of the level of the signal light beam input to the upward-bound repeater 18.

The input signal level from the input signal level detector 22, the output signal level from the output signal level detector 38, the pumping current (the bias current for the semiconductor laser) in the pumping light source 30, and the pumping light output from the same are delivered to the downward-bound repeater 20 as upward-bound supervisory information. This upward-bound supervisory information is delivered to the downward-bound optical transmission line 14 by modulating the pumping light beam (also refer to FIG. 5).

On the other hand, downward-bound supervisory information is accepted by the upward-bound repeater 18 through a signal processor 44 and the pumping light beam from the pumping light source 30 is modulated by the downward-bound supervisory information. Thus, the downward-bound supervisory information is transmitted through the upward-bound optical transmission line 12.

The detailed operation of the above will now be described. A delivery command of the downward-bound supervisory information to the upward-bound repeater 18 is received by the receiver 32 of the upward-bound repeater 18. The receiver 32 decodes the command and informs a controller 46 of the decoded command. This decoding can be achieved by subjecting the address information received by the receiver 32 to detection performed in an agreement detector 42, to determine whether the address information is in agreement with address information stored therein in advance. The controller 46, upon receipt of the delivery command of the supervisory information, controls a modulating circuit 48 depending on the downward-bound supervisory information from the signal processor 44. As a result, the pumping light beam from the pumping light source 30 is intensity-modulated, for example. By arranging the modulation speed at this time to be sufficiently higher than the reciprocal of the life span of the fluorescence in the rare-earth-doped fiber 28, even if the pumping light beam from the pumping light source 30 is modulated, the modulation component hardly appears in the signal light beam amplified in and delivered from the upward-bound repeater 18. Thus, it becomes possible to achieve transmission of supervisory information carried by the pumping light beam which acts as the carrier in addition to transmission of information with the signal light beam that is directly amplified. When both sets of address information are not in agreement as determined by the agreement detector 42 and, therefore, there is no necessity for delivering the downward-bound supervisory information to the upward-bound optical transmission line 12, the supervisory information carried by the pumping light beam accepted from the preceding stage by the receiver 32 is caused to be reproduced and amplified by the controller 46. The thus obtained information is used for modulating the pumping light source 30.

Figure 7:
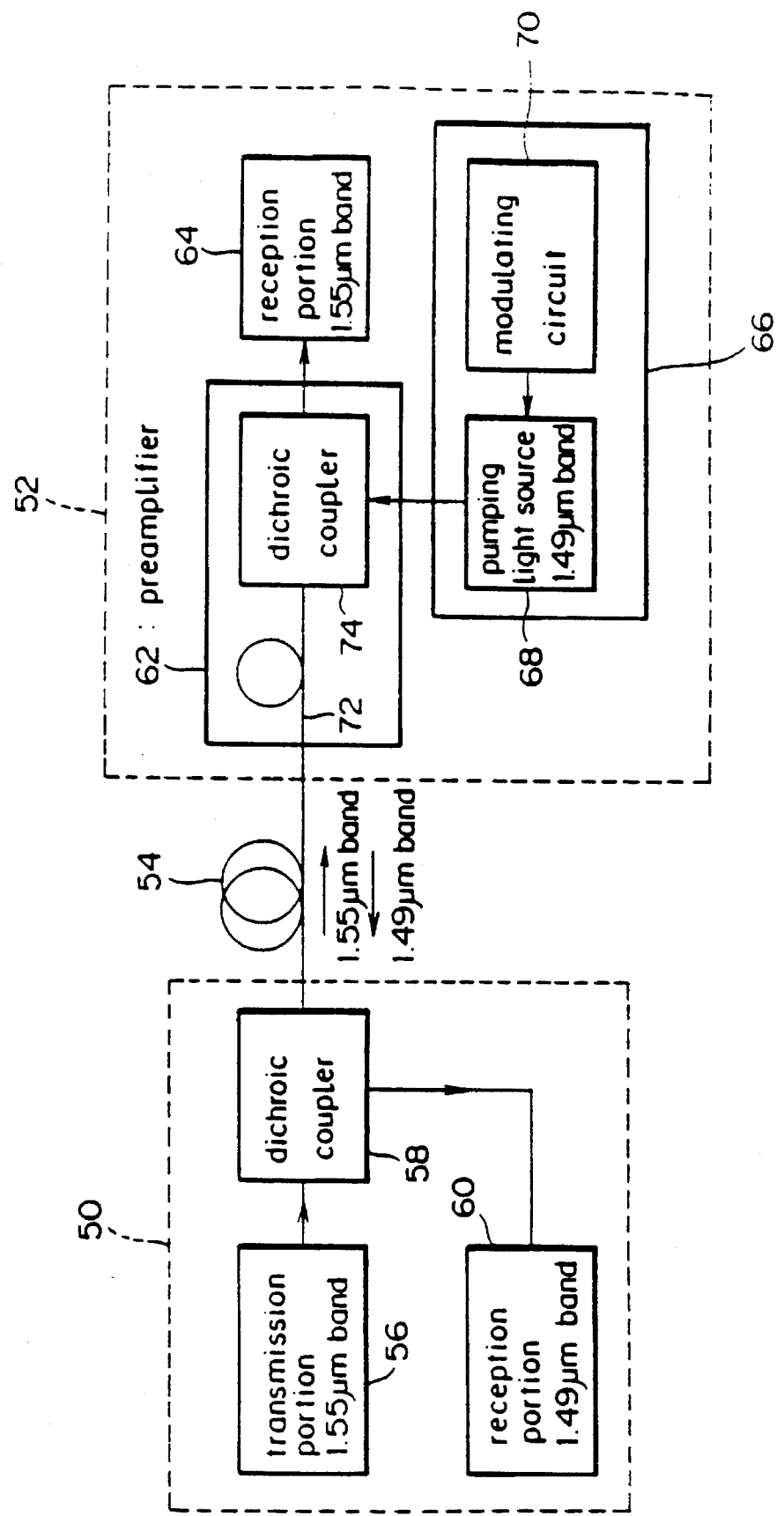
FIG. 7 is a block diagram of a two-way transmission system according to an embodiment of the present invention.

FIG. 7 is a block diagram showing an arrangement of a two-way transmission system with the present invention applied thereto. This system has a first terminal station 50 and a second terminal station 52 connected through a single optical fiber 54 to achieve the two-way transmission. The first terminal station 50 comprises a transmission portion 56 for transmitting a signal light of 1.55 μm band, a reception portion for receiving a modulated pumping light beam of 1.49 μm band, and a dichroic coupler 58. The second terminal station 52 comprises a preamplifier 62, a reception portion 64 for receiving the signal light beam of 1.55 μm band, and a transmission portion 66 for modulating and transmitting the pumping light beam of 1.49 μm band. The transmission portion 66 includes a pumping light source 68 and a modulating circuit 70 for intensity-modulating the semiconductor laser of the pumping light source 68. The preamplifier 62 includes a rare-earth-doped fiber 72 connected to the optical fiber 54 and a dichroic coupler 74 for both leading the modulated pumping light beam into the rare-earth-doped fiber 72 and delivering the signal light beam amplified by the rare-earth-doped fiber 72 to the reception portion 64.

The signal light beam from the transmission portion 56 of the first terminal station 50 is delivered to the optical fiber 54 through the dichroic coupler 58 and, then, amplified by the preamplifier 62 of the second terminal station 52 and received by the reception portion 64. At this time, since the signal light beam is amplified by the preamplifier 62 (optical fiber amplifier), the reception sensitivity is enhanced. On the other hand, the modulated pumping light beam delivered from the transmission portion 66 of the second terminal station 52, contributes to the amplification of the signal light beam from the first terminal station 50 without producing any effect on the signal light beam, even though the pumping light beam is modulated. The modulated pumping light beam is transmitted to the first terminal station 50 through the optical fiber 54 and is accepted by the reception portion 60 so that the transmitted information is reproduced therein.

Since the signal light beam and the pumping light beam are adapted to be propagated in opposite directions through the rare-earth-doped fiber 72, two-way transmission is achieved by the transmission of information with the signal light beam and by the transmission of information with the pumping light beam acting as a carrier.

The modulation of the pumping light source 68 in the transmission portion 66 of the second terminal station 52 is performed in the same manner as in the embodiment described with reference to FIG. 5 and FIG. 6, that is, by a high-frequency modulating signal having a period shorter than the life span of fluorescence resulting from the excited state in the rare-earth-doped fiber or thereabout.

In the case where the rare-earth-doped fiber is doped with erbium as the rare earth element, the life span of fluorescence resulting from the excited state is approximately 14 ms, for example, and, hence, a practically sufficient transmission capacity can be obtained.

What is claimed is:

1. An optical amplifier amplifying a received optical signal, comprising:

a pumping light source outputting a first light beam for pumping and monitor information of a second light beam thereof;

an optical fiber, doped with a rare earth element, having an input and an output; and a first optical coupler introducing a received optical signal and the first light beam to the input of said optical fiber, the received optical signal being amplified from being propagated through the optical fiber and output from the output of said optical fiber.

2. An optical amplifier amplifying a received optical signal, comprising:

a pumping light source outputting a first pumping light beam and supervisory information of a second light beam;

an optical fiber, doped with a rare earth element, having an input and an output;

optical connecting means for introducing the received optical signal to the input of said optical fiber;

an optical coupler, coupled to said optical fiber, providing the first pumping light beam to be propagated through said optical fiber; and an optical isolator preventing the received optical signal from propagating in a direction from said receiver to the output of said optical fiber, the received optical signal being amplified from being propagated through the optical fiber and being output from the output of said optical fiber.

3. An optical amplifier amplifying a received optical signal, comprising:

an optical fiber, doped with a rare earth element, having an input and an output;

means for inputting a received optical signal to the input of said optical fiber;

a pumping light source emitting a first light beam for pumping and supervisory information of a second light beam; and means for inputting the first light beam either to the input or the output of said optical fiber, the received optical signal being amplified from being propagated through the optical fiber and being output from the output of said optical fiber.

4. An optical transmission system for transmitting an optical signal, comprising:

a first terminal station transmitting an optical signal to an optical fiber line;

a second terminal station, having an optical receiver, receiving the optical signal;

an optical amplifier, optically connected to the optical fiber line, amplifying the optical signal from the optical fiber, including a rare earth element doped optical fiber having an input and an output;

means for receiving the optical signal from the optical fiber line and inputting the optical signal to the input of said rare earth element doped optical fiber;

a pumping light source, optically coupled to either the input or the output of the rare earth element doped optical fiber, emitting a first light beam for pumping introduced to either the input or the output, respectively, of the rare earth element doped optical fiber and monitor information of a second light beam; and means for outputting the optical signal amplified resulting from propagation through the optical fiber to the optical receiver.

5. An optical transmission system for transmitting an optical signal, comprising:

a first terminal station transmitting an optical signal to an optical fiber line;

an optical amplifier, optically connected to the optical fiber line to amplify the optical signal from the optical fiber line, including, a rare earth element doped optical fiber having an input and an output;

means for receiving the optical signal from the optical fiber line and inputting the optical signal to the input of said rare earth element doped optical fiber;

a pumping light source, optically coupled to either the input or the output of said rare earth element doped optical fiber, emitting a first pumping light beam introduced to the input or the output, respectively, of the rare earth element doped optical fiber and supervisory information of a second light beam; and means for outputting the optical signal amplified resulting from propagation through the rare earth element doped optical fiber.

6. An optical transmission system for transmitting an optical signal, comprising:

a first terminal station transmitting an optical signal to an optical fiber line; and a second terminal station, including:
an optical amplifier, optically connected to the optical fiber line, amplifying the optical signal from the optical fiber, including, a rare earth element doped optical fiber having an input and an output;

means for receiving the optical signal from the optical fiber line and inputting the optical signal to the input of said rare earth element doped optical fiber;

a pumping light source emitting a first light beam for pumping and monitor information of a second light beam; and means for inputting the amplified optical signal propagated through the optical fiber to an optical receiver and preventing the optical signal from propagating in a direction toward the output of said optical fiber, the optical receiver receiving the amplified optical signal from the output of said optical fiber.

7. An optical terminal station, connected an optical fiber line, comprising:

an optical amplifier, optically connected to the optical fiber line, amplifying the optical signal from the optical fiber, including a rare earth element doped optical fiber having an input and an output;

means for receiving the optical signal from the optical fiber line and inputting the optical signal to the input of said rare earth element doped optical fiber;

a pumping light source emitting a first pumping light beam to the rare earth element doped optical fiber and supervisory information of a second light beam;

means for inputting the optical signal amplified resulting from propagation through the optical fiber to the optical receiver; and an optical receiver receiving the amplified optical signal from the output of said optical fiber.

8. A method for amplifying a received optical signal comprising the steps of:

introducing a first light beam for pumping from a pumping light source and the received optical signal to an input of an optical fiber;

outputting monitor information of a second light beam from the pumping light source;

propagating the received optical signal through the optical fiber and outputting the propagated received optical signal; and preventing the propagated received optical signal from propagating in an undesired direction.

9. A method for transmitting an optical signal, comprising the steps of:

transmitting an optical signal to an optical fiber line to an optical receiver supplying the optical signal from the optical fiber line to an optical amplifier, which includes a rare earth element doped optical fiber;

supplying a first light beam for pumping from a pumping light source to the rare earth element doped optical fiber;

propagating the optical signal through the optical fiber; and outputting supervisory information of a second light beam of the pumping light source.

10. An optical amplifier amplifying a received optical signal, comprising:

a semiconductor laser outputting a pumping light beam and monitor information of a bias current thereof;

an optical fiber, doped with a rare earth element, having an input and an output; and a first optical coupler introducing a received optical signal and the pumping light beam to the input of said optical fiber, the received optical signal being amplified from being propagated through the optical fiber and output from the output of said optical fiber.

11. An optical amplifier amplifying a received optical signal, comprising:

a semiconductor laser outputting a pumping light beam and supervisory information of a bias current thereof;

an optical fiber, doped with a rare earth element, having an input and an output;

optical connecting means for introducing the received optical signal to the input of said optical fiber;

an optical coupler, coupled to said optical fiber, providing the pumping light beam to be propagated through said optical fiber; and an optical isolator preventing the received optical signal from propagating in a direction from said receiver to the output of said optical fiber, the received optical signal being amplified from being propagated through the optical fiber and output from the output of said optical fiber.

12. An optical amplifier amplifying a received optical signal, comprising:

an optical fiber, doped with a rare earth element having an input and an output;

means for inputting a receiving optical signal to the input of said optical fiber;

a pumping light source outputting a pumping light beam either to the input or the output of said optical fiber and supervisory information for a pumping light beam;

the received optical signal being amplified from being propagated through the optical fiber and output from the output of said optical fiber.

13. An optical transmission system for transmitting an optical signal, comprising:

a first terminal station transmitting an optical signal to an optical fiber line;

a second terminal station, having an optical receiver, receiving the optical signal;

an optical amplifier, optically connected to the optical fiber line, amplifying the optical signal from the optical fiber which includes a rare earth element doped optical fiber having an input and an output;

means for receiving the optical signal from the optical fiber line and inputting the optical signal to the input of said rare earth element doped optical fiber;

a semiconductor laser optically coupled to either the input or the output of the rare earth element doped optical fiber, outputting a pumping light beam introduced to the input or the output, respectively, of the rare earth element doped optical fiber and monitor information of a bias current thereof; and means for outputting the optical fiber to the optical receiver.

14. An optical transmission system for transmitting an optical signal, comprising:

a first terminal station transmitting an optical signal to an optical fiber line;

an optical amplifier, optically connected to the optical fiber line to amplify the optical signal from the optical fiber line, including a rare earth element doped optical fiber having an input and an output;

means for receiving the optical signal from the optical fiber line and inputting the optical signal to the input of said rare earth element doped optical fiber;

a semiconductor laser, optically coupled to either the input or the output of said rare earth element doped optical fiber, outputting a pumping light beam introduced to the input or the output, respectively, of the rare earth element doped optical fiber and supervisory information of a bias current thereof; and means for outputting the amplified optical signal resulting from propagation through the rare earth element doped optical fiber.

15. An optical transmission system for transmitting an optical signal, comprising:

a first terminal station transmitting an optical signal to an optical fiber line; and a second terminal station, including:
an optical amplifier, optically connected to the optical fiber line, amplifying the optical signal from the optical fiber which includes a rare earth element doped optical fiber having an input and an output;
means for receiving the optical signal from the optical fiber line and inputting the optical signal to the input of said rare earth element doped optical fiber;
a semiconductor laser outputting a pumping light beam and monitor information of a bias current thereof;
means for inputting the amplified optical signal propagated through the optical fiber to an optical receiver and preventing the optical signal from propagating in a direction toward the output of said optical fiber, the optical receiver receiving the amplified optical signal from the output of said optical fiber.

16. An optical terminal station, connected to an optical fiber line, comprising:

an optical amplifier, optically connected to the optical fiber line to amplify the optical signal from the optical fiber, including a rare earth element doped optical fiber having an input and an output;

means for receiving the optical signal from the optical fiber line and inputting the optical signal to the input of said rare earth element doped optical fiber;

a semiconductor laser outputting a pumping light beam to one of the input and the output of the optical fiber and a supervisory information of a bias current thereof;

means for inputting the optical signal amplified resulting from propagation through the optical fiber to an optical receiver; and an optical receiver receiving the amplified optical signal from the output of said optical fiber.

17. A method for amplifying a received optical signal comprising the steps of:

introducing a pumping light beam from a semiconductor laser and the received optical signal to an input of an optical fiber;

outputting supervisory information of a bias current of the semiconductor laser;

propagating the received optical signal through the optical fiber and outputting the propagated received optical signal; and preventing the propagated received optical signal from propagating in an undesired direction.

18. A method for transmitting an optical fiber line to an optical receiver supplying the optical signal from the optical fiber line to an optical amplifier which includes a rare earth element doped optical fiber, comprising;

supplying a pumping light beam from a semiconductor laser to the rare earth element doped optical fiber;

propagating the optical signal through the optical fiber;

outputting monitor information of a bias current of the semiconductor laser.

* * * * *

UNITED STATES PATENT AND TRADEMARK OFFICE
CERTIFICATE OF CORRECTION

PATENT NO. : 5,535,050  Page 1 of 4
DATED : JULY 9, 1996
INVENTOR(S) : Masuo SUYAMA It is certified that error appears in the above-indentified patent and that said Letters Patent is hereby corrected as shown below:

Col. 7, line 52, "from being" should be --by propagation--;
        line 53, "propagated" should be deleted.

Col. 8, line 1, "signal" should be --signal, amplified by propagation through the optical fiber and output from the output of said optical fiber,--;
        line 2, "from said receiver to" should be --toward--;
        line 3, "fiber," should be --fiber.--;
        line 4, "the received optical signal being amplified from being" should be deleted;
        line 5, "propagated through the optical fiber and being output" should be deleted;
        line 6, "from the output of said optical fiber." should be deleted;
        line 19, "from being" should be --by propagation--;
        line 20, "propagated" should be deleted;
        line 27, "signal;" should be --signal; and--;
        line 30, "including" should be --including:--; and
        line 30, "a rare earth element" should be a paragraph, with paragraph indentation;
        line 38, "emitting" should be --outputting--;
        line 39, "output, respec-" should be --output--;
        line 40, "tively," should be deleted;
        line 42, "resulting" should be --by--;
        line 43, "from" should be deleted;
        line 43, "the optical" should be --the rare earth element doped optical--;
        line 48, "fiber line;" should be --fiber line; and
        line 51, "including," should be --including:--; and
        line 51, "a rare earth element" should be a paragraph, with paragraph indentation;
        line 60, "duced to the input or the output, respectively, of the rare" should be --duced to one of input and the output of the rare--;
        line 61, "and supervisory" should be --and outputting supervisory--;
        line 63, "resulting" should be --by-;
        line 64, "from" should be deleted.

UNITED STATES PATENT AND TRADEMARK OFFICE
CERTIFICATE OF CORRECTION

PATENT NO. : 5,535,050

DATED : JULY 9, 1996

INVENTOR(S) : Masuo SUYAMA

It is certified that error appears in the above-indentified patent and that said Letters Patent is hereby corrected as shown below:

Col. 9, line 6, "including," should be --including:--; and
line 6, "a rare earth element" should be a paragraph, with paragraph indentation;
line 12, "pumping and" should be --pumping to one of the input and output of the rare earth element doped fiber and--;
line 15, "the optical" should be --the rare earth element doped optical--;
line 17, "said optical fiber, the" should be --said rare earth element doped optical fiber.--;
line 18, "optical receiver receiving the amplified optical signal" should be deleted;
line 19, "from the output of said optical fiber." should be deleted;
line 21, "an optical amplifier," should be --a rare earth element doped fiber,--;
line 23, "fiber, including a rare earth element doped optical fiber" should be --fiber line, and--;
line 30, "beam to the" should be --beam to one of the input and output of the--;
line 31, "supervisory" should be --outputting supervisory--;
line 32, "inputting" should be --outputting--; and
line 32, "resulting" should be --by--;
line 33, "from" should be deleted; and
line 33, "the optical fiber to the optical" should be --the rare earth metal doped optical fiber;--;
line 34, "receiver;" should be deleted;
line 36, "from the output of said optical fiber" should be deleted;
line 41, "fiber;" should be --fiber doped with a rare metal element;--;
line 59, "the optical" should be --the rare earth element doped optical--.

UNITED STATES PATENT AND TRADEMARK OFFICE
CERTIFICATE OF CORRECTION

PATENT NO. : 5,535,050

DATED : JULY 9, 1996

INVENTOR(S) : Masuo SUYAMA

It is certified that error appears in the above-indentified patent and that said Letters Patent is hereby corrected as shown below:

Col. 10, line 6, "from being" should be --by propagation--;
line 7, "propagated" should be deleted;
line 17, "coupler, coupled" should be --coupler, optically coupled--;
line 20, "signal" should be --signal output from the output of the optical fiber--;
line 21, "from said receiver" should be deleted;
line 24, "from being" should be --by propagation--;
line 25, "propagated" should be deleted;
line 37, "from being" should be --by propagation--;
line 38, "propagated" should be deleted;
line 45, "signal;" should be --signal; and--;
line 48, "which includes" should be --line including:--; and
line 48, "a rare earth element doped" should be a paragraph, with paragraph indentation;
line 55, "introduced to" should be --introduced to one of--;
line 56, "input or the output, respectively," should be --input and the output--.

Col. 11, line 9, "duced to the input or the output, respectively," should be --duced to one of the input and the output--;
line 23, "fiber which includes" should be --fiber, including:--; and
line 23, "a rare earth element" should be a paragraph, with paragraph indentation;
line 31, "the optical" should be --the rare earth element doped optical--;
line 35, "said optical fiber." should be --said rare earth element doped optical fiber.--.

UNITED STATES PATENT AND TRADEMARK OFFICE
CERTIFICATE OF CORRECTION

PATENT NO. : 5,535,050

DATED : JULY 9, 1996

INVENTOR(S) : Masuo SUYAMA

It is certified that error appears in the above-indentified patent and that said Letters Patent is hereby corrected as shown below:

Col. 12, line 1, "fiber, including" should be --fiber line, including:--; and
       line 1, "a rare earth element doped" should be a paragraph, with paragraph indentation;
       line 10, "inputting the optical signal amplified resulting" should be --means for outputting the amplified optical signal resulting--;
       line 11, "the optical fiber to an optical" should be --the rare earth element doped optical fiber;--
       line 12, "receiver;" should be deleted;
       line 15, "optical fiber." should be --rare earth element doped optical fiber.--;
       line 20, "optical fiber;" should be --optical fiber doped with a rare earth element;--;
       line 29, "transmitting" should be --transmitting an optical signal through--;
       line 35, "the optical fiber;" should be --the rare earth element doped optical fiber;--.

Signed and Sealed this

Fifteenth Day of October, 1996

Attest:

BRUCE LEHMAN

*Attesting Officer*       *Commissioner of Patents and Trademarks*